(12) United States Patent
Hassler

(10) Patent No.: US 11,917,216 B2
(45) Date of Patent: Feb. 27, 2024

(54) REMOTE PAUSE BUFFER

(71) Applicant: Comcast Cable Communications, LLC, Philadelphia, PA (US)

(72) Inventor: Garey Hassler, Castle Pines, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/495,478

(22) Filed: Oct. 6, 2021

(65) Prior Publication Data

US 2022/0103877 A1 Mar. 31, 2022

Related U.S. Application Data

(63) Continuation of application No. 16/045,974, filed on Jul. 26, 2018, now Pat. No. 11,166,052.

(51) Int. Cl.
*H04N 7/173* (2011.01)
*H04N 21/234* (2011.01)
*H04N 21/2387* (2011.01)

(52) U.S. Cl.
CPC ... *H04N 21/23406* (2013.01); *H04N 21/2387* (2013.01)

(58) Field of Classification Search
CPC ......... H04N 21/23406; H04N 21/2387; H04N 21/26258; H04N 21/2747; H04N 21/4135; H04N 21/4147; H04N 21/4331; H04N 21/4333; H04N 21/4334; H04N 21/43622; H04N 21/8456
See application file for complete search history.

(56) References Cited

U.S. PATENT DOCUMENTS

| | | |
|---|---|---|
| 7,779,142 B1 | 8/2010 | Greene et al. |
| 8,433,815 B2 | 4/2013 | van Coppenolle et al. |
| 9,043,822 B1 | 5/2015 | Calzone et al. |
| 9,124,911 B2 | 9/2015 | Rothschild et al. |
| 9,197,932 B1 | 11/2015 | Wannamaker |
| 9,226,007 B2 | 12/2015 | Rothschild et al. |
| 9,344,668 B2 | 5/2016 | Lang et al. |
| 9,654,828 B1 | 5/2017 | Wannamaker |
| 9,819,984 B1 | 11/2017 | Neill et al. |
| 10,019,469 B1 * | 7/2018 | Braun ..................... G06Q 30/04 |
| 2002/0075882 A1 | 6/2002 | Donis et al. |
| 2005/0183120 A1 | 8/2005 | Jain et al. |
| 2006/0080703 A1 | 4/2006 | Compton |
| 2008/0118230 A1 * | 5/2008 | Kirsche ................ H04N 9/8042 386/291 |
| 2011/0038613 A1 | 2/2011 | Buchheit |
| 2012/0008912 A1 | 1/2012 | Stevens |
| 2012/0096497 A1 | 4/2012 | Xiong et al. |
| 2012/0117214 A1 | 5/2012 | Mengle et al. |
| 2014/0237522 A1 * | 8/2014 | Rothschild ....... H04N 21/23805 725/88 |
| 2016/0323653 A1 | 11/2016 | Chen et al. |
| 2017/0127121 A1 | 5/2017 | Lingley et al. |
| 2017/0353768 A1 * | 12/2017 | Muvavarirwa .. H04N 21/85403 |
| 2019/0214051 A1 | 7/2019 | Kirsche |
| 2019/0349633 A1 * | 11/2019 | Wannamaker ..... H04N 21/4532 |

* cited by examiner

*Primary Examiner* — Gigi L Dubasky
(74) *Attorney, Agent, or Firm* — Banner & Witcoff, Ltd.

(57) ABSTRACT

Systems, apparatuses, and methods are described for replacing at least a part of a local time shift buffer of a user device with a remote time shift buffer.

24 Claims, 7 Drawing Sheets

REMOTE PAUSE BUFFER

CROSS-REFERENCE TO RELATED APPLICATIONS

This application is a continuation of U.S. patent application Ser. No. 16/045,974, filed Jul. 26, 2018. The above-referenced application is hereby incorporated by reference in its entirety.

BACKGROUND

Digital video recorders (DVRs) may use a pause buffer, e.g., a time shift buffer (TSB), to continuously record video content that is being presented for display, and viewers are able to pause and rewind the video content by having the DVR play back content from the TSB. This constant recording in the TSB, however, presents wear and tear on the TSB and DVR components.

SUMMARY

The following summary presents a simplified summary of certain features. The summary is not an extensive overview and is not intended to identify key or critical elements.

Systems, apparatuses, and methods are described for use of a remote, or cloud-based, pause buffer, e.g., a remote, or cloud-based, time shift buffer (cTSB). The cTSB may continuously record content from a variety of content streams that are being delivered to user devices, creating a master buffer for each of the streams. After a particular user device sends a request to pause or rewind one of the content streams, the cTSB may create an individualized copy of the master buffer of that stream, and may send an address of the individualized copy (an individual buffer) to the user device. The cTSB may also update the individual buffer when it updates the master buffer, providing the user with on-demand availability of a temporary time shift buffer. When the user device resumes playback of content, the user device may retrieve content from the individual buffer based on the address of the individual buffer.

While the content is paused, the user device may periodically retrieve portions of the content (e.g., frames every 5 seconds, or every intra-coded/independent frame (I-frame) in a motion-encoded video format), and store it for use in simplifying the playback process. For example, if a user pauses a video program, the user device may obtain periodic video frames while the program is paused, and when the user wishes to resume viewing the program, the user may be presented with a timeline of the various frames, so that the user can choose a point in the program to resume viewing (e.g., if the user does not wish to simply resume where the user stopped watching).

The master and individual buffers may be circular buffers having a time and/or size limit. So, for example, the buffers may simply record the previous 30 minutes of a particular content stream, with the newest portion overwriting the oldest portion as time progresses. These buffers may be continuously updated, and the cTSB may maintain an updated listing of the various files and program segments that are available in these buffers, and the user device may periodically request and obtain the latest version of this listing, so that an accurate listing may be offered to the user if and when the user is ready to resume watching the program.

The cTSB may delete the individual buffer when it is no longer needed, such as under one or more of the following example circumstances: (1) when the user device changes a channel, (2) when the user device is powered off, (3) when a player application (e.g., an application executing the playback of content) is terminated, or (4) when the stored content has not been used for a certain period of time.

With the cTSB system, the user device need not maintain its own TSB, thereby saving time and expense associated with maintenance of a TSB at the user device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
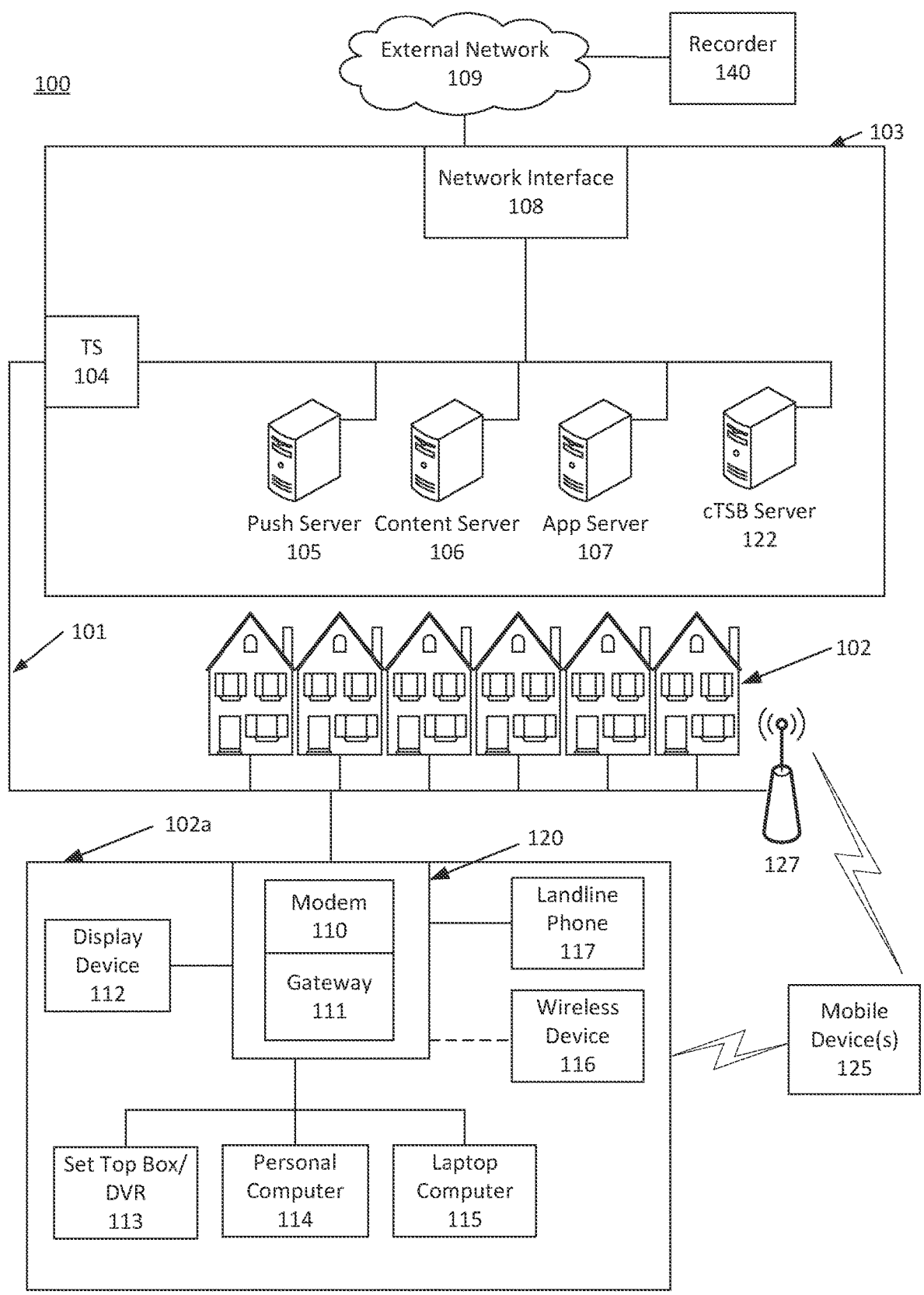
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links

101 and backend devices such as servers 105-107 and 122. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including a cTSB server 122 (described below), additional push, content, and/or application servers, and/or other types of servers.

Content may include video content and audio content. Video content may comprise information displayed (or displayable) to a user in the form of one or more images. Video content may have associated the audio content, e.g., information presented (or presentable) to a user in audio form. Video content may be communicated or stored in the form of data. Video content data providing a digital representation of a particular video content may be created using any of various encoding techniques. Such encoding techniques include, but are not limited to, compression according to a Motion Picture Experts Group (MPEG) standard (e.g., MPEG-2), compression according to the ITU-T H.264 (ISO/IEC MPEG-4) advanced video coding (AVC) standard, etc.

In video content encoded using either MPEG-2 or AVC, the video may be divided into multiple video fragments, e.g., video data chunks each having, for example, a few seconds duration. The system may send a manifest of the video content to the user devices. The manifest may list segment identifications (IDs), an access location (e.g., network address, Internet address, uniform resource locator (URL), etc.) of each segment, and other parameters of each video segment of the video. The manifest may be a video stream description file that describes any characteristic of the video stream.

MPEG-2 encoding may use motion vector-based compression to efficiently represent the stream of image frames. Using this compression, each frame is categorized as either an independent frame or a dependent frame. Independent frames are represented in the stream by data that is sufficient to generate the frame's complete image without knowledge about neighboring frames in the stream, similar to how a still image picture may be represented. The first frame after a scene change is typically represented using an independent frame.

In the MPEG-2 standard, independent frames are referred to as Intra-coded picture frames (I-frames), while dependent frames are referred to as either Predicted picture frames (P-frames), or a Bi-directional predicted picture frames (B-frames). A P-frame is dependent on a prior frame in the stream, while a B-frame is dependent on both a prior and a subsequent frame in the stream. The manifest may further include an access location of each I-frame.

The cTSB server 122 may be one or more computing devices configured to instruct a recorder 140 (e.g., the remote recorder) to generate and store an individual remote TSB for a user device that pauses playback of content. The cTSB server 122 may be located anywhere in the system 100, and a remote TSB may be physically remote from a user device on which (or via which) a user is viewing content. Details of the cTSB server 122 will be described in FIGS. 3A-3C and 5.

The recorder 140 may be one or more computing devices configured to generate and store the individual TSB for a user device that pauses playback of content. The recorder 140 may be located anywhere in the system 100. Details of the recorder 140 will be described in FIGS. 3A-3C.

Although shown separately, the push server 105, the content server 106, the application server 107, the cTSB server 122, and/or other server(s) may be combined. The servers 105, 106, 107, and 122, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the cTSB server 122. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components. Any one of the display device 112, the STBs or DVRs 113, personal computers 114, laptop computers 115, wireless devices 116, and mobile devices 125 may be a user device described in connection with FIGS. 3A-5.

Figure 2:
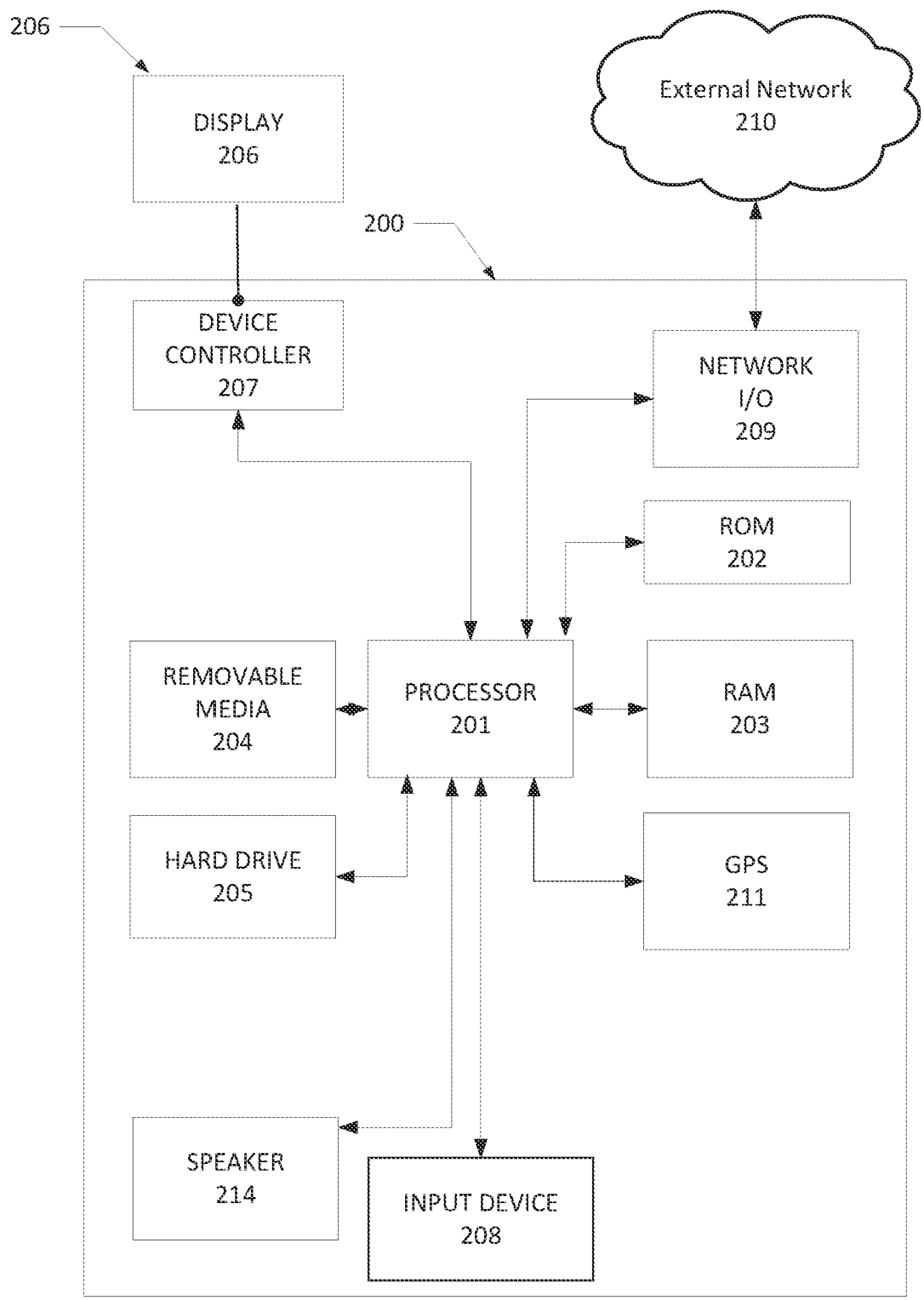
FIG. 2 shows hardware elements of a computing device.

FIG. 2 shows hardware elements of a computing device that may be used to implement any of the computing devices discussed herein (e.g., the cTSB server, the user device, and the recorder). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

When a user of a user device pauses watching a channel (e.g., by pressing a "pause" button on a remote control, by using a voice command to pause, etc.), the local TSB of the user device downloads and stores the channel content up to a size limit (e.g., 2 gigabytes) or to a time limit (e.g., 30 minutes of video content) for future playback when the user resumes watching the channel (e.g., by pressing a "resume" button on the remote control, by using a voice command to resume, etc.). In many cases, because the user may only request playback of a small fraction of the stored content before the stored content is erased, only the small fraction of the stored content is utilized for playback. For example, the user pauses at 29-minute of a 30-minute TV show. The local TSB then downloads and stores 30 minutes of video content for future playback. The user comes back and resumes watching the show 30 minutes after pause. The user only watches the last 1-minute of the 30-minute show and turns off the set-top box or changes to another channel. In this example, only 1 minute of the 30-minute stored content is used for playback before the 30-minute stored content is erased. In other cases, because many users do not resume watching the channel at all, the stored content is erased without being used for playback. For example, the user pauses watching a TV show, and comes back after 30 minutes and turns off the set-top box. In this example, no content of the 30-minute stored content is used before the 30-minute stored content is erased. As a result, there is greater wear and tear on the local hard disk of the user device from continuous writing of content which is ultimately deleted without use by the user device, and the bandwidth allocated for transmitting the unused stored content to the user device is wasted.

To minimize recovery in the user device failure due to excess writing and erasing content from hard disk of the user device and save the bandwidth allocated for transmitting the unused stored content, a remote TSB (e.g., an individual buffer stored in the remote recorder) may replace the entirety of or at least a part of the local TSB to store content for future playback in pause events. These features will be further described with reference to FIGS. 3A through 5, described below.

Figure 3A:
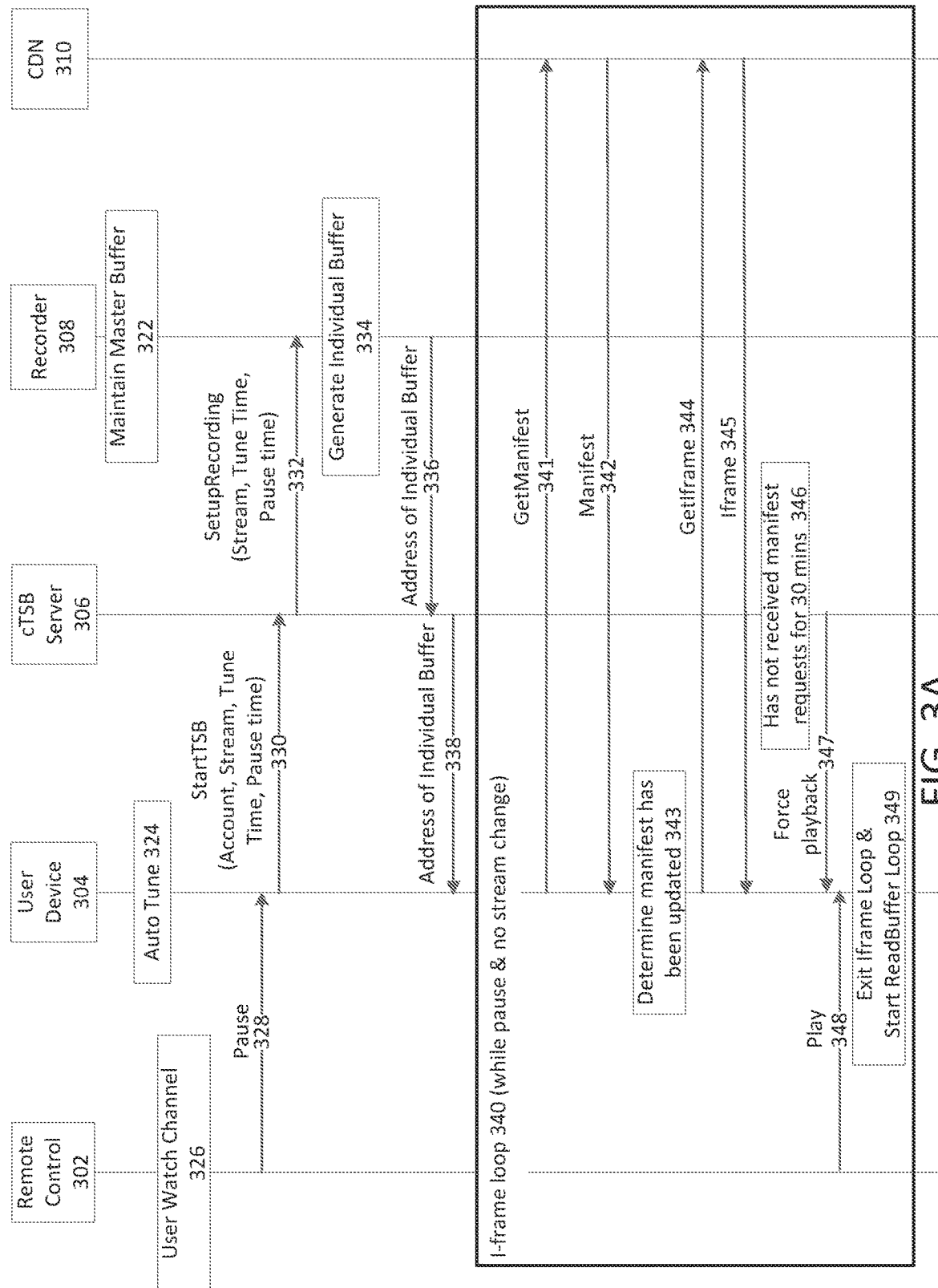
FIGS. 3A, 3B, and 3C constitute a signal diagram showing an example of operation of the cTSB system.
Figure 3B:
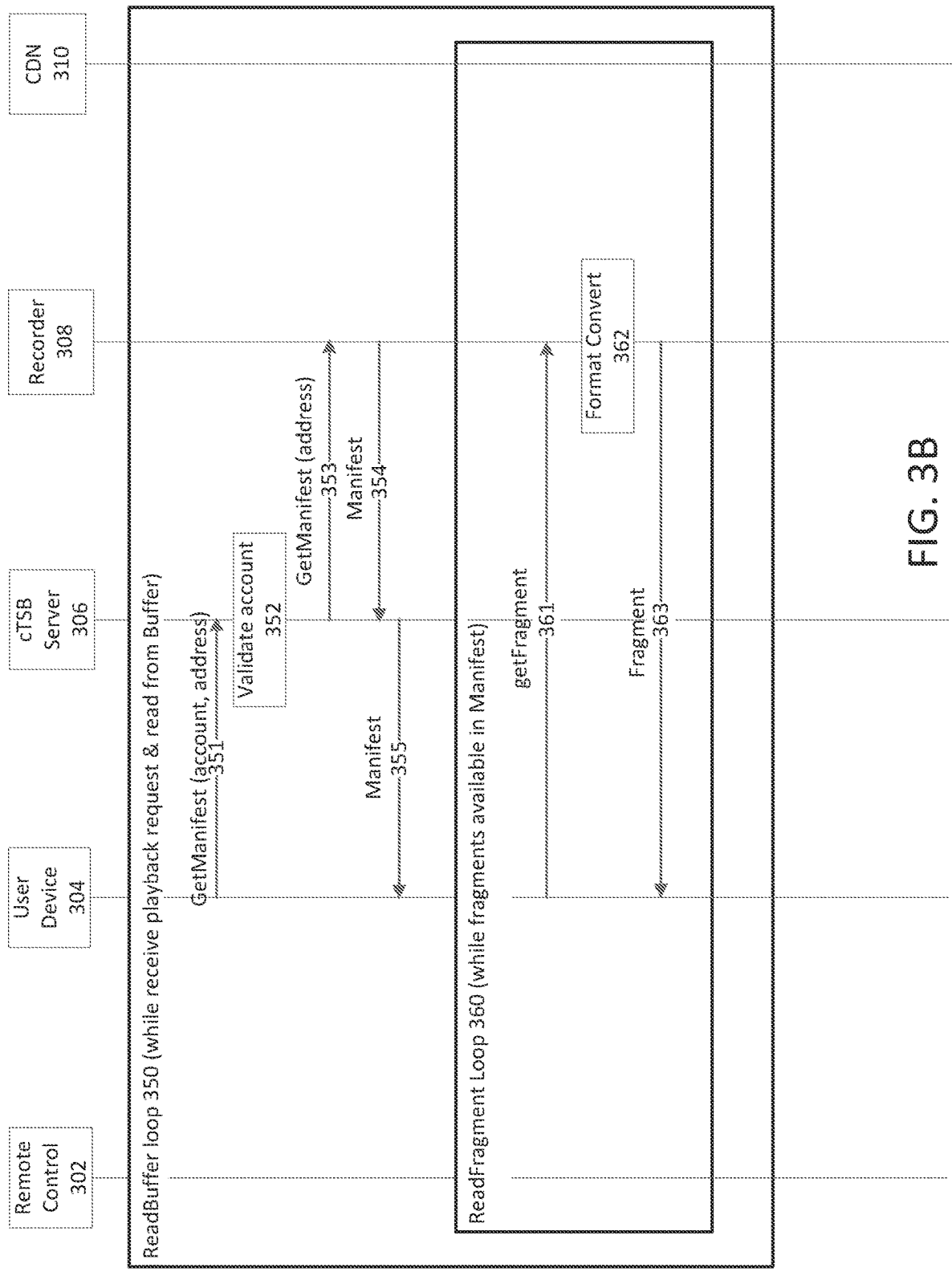
Figure 3C:
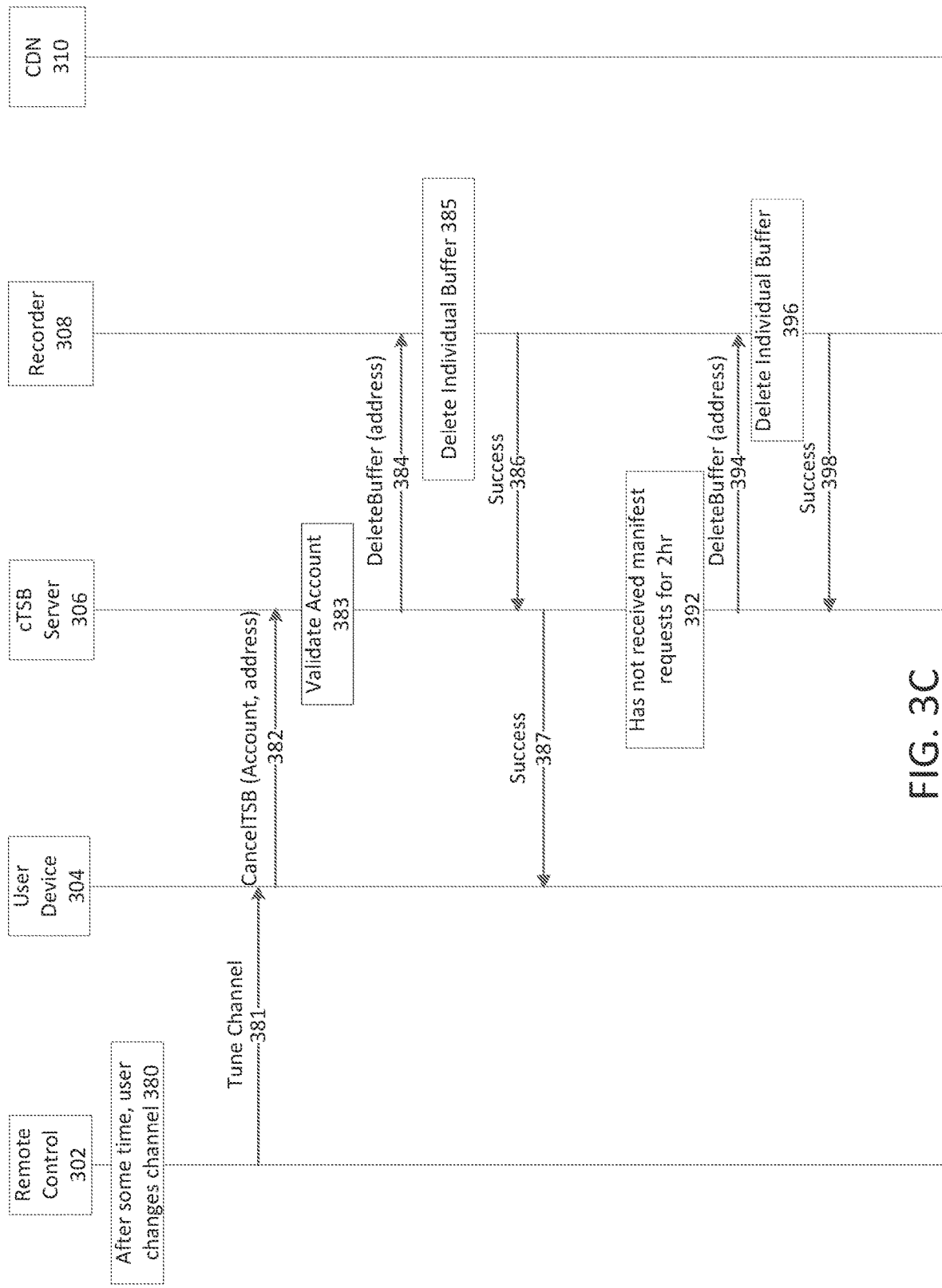

FIGS. 3A, 3B, and 3C constitute a signal diagram showing an example of operation of the cTSB system. As shown in FIGS. 3A-3C, the cTSB system may include a user input device (e.g., a remote control 302), a user device 304, the cTSB server 306, the recorder 308, and a content delivery network (CDN) 310. In some cases, the cTSB system may include more than one remote control 302, more than one user device 304, more than one cTSB server 306, more than one recorder 308, and more than one content delivery network (CDN) 310.

As an example, FIG. 3A shows the remote control 302 as a unit disposed separately from the user device 304. In some cases, the remote control 302 may be a part of the user device 304.

The user device 304 may be any computing device that is capable of performing playback of content. As discussed above, the user device 304 may be one or more of the display device 112, the STBs or DVRs 113, the personal computers 114, the laptop computers 115, the wireless devices 116, or the mobile devices 125 as shown in FIG. 1.

The cTSB server 306 may be same as the cTSB server 122 shown in FIG. 1. The cTSB server 306 and the user device 304 may be located at different premises, respectively. The cTSB server 306 may communicate with the user device 304 via a network element (not shown on the figures), e.g., an extensible user interface language (XUL) runtime element (XRE).

The recorder 308 may be same as the recorder 140 shown in FIG. 1. The recorder 308 and the user device 304 may be located at different premises, respectively. The recorder 308 and the cTSB server 306 may be co-located, and may even both be part of the same computing device.

The CDN 310 may be a network providing content (e.g., video and/or audio content). The CDN may employ a hierarchy of computer servers (e.g., caching servers). In an example distribution hierarchy of caching servers, the top of the hierarchy is the origin caching server (e.g., a caching server that stores the original copy of a video asset); and further down in the hierarchy may be one or more intermediate level caching servers and the edge caching servers (e.g., a caching server that is closest to the user device).

Even though the CDN 310 is shown as a unit disposed separately from the cTSB server 306 and the recorder 308, the cTSB server 306 and the recorder 308 may be located at any one or more of the computer servers in the CDN 310.

As shown in FIG. 3A, at step 322 where the cTSB system is initialized, the recorder 308 may generate and maintain a master buffer for a stream (e.g., a video/audio stream such as a TV channel).

The master buffer may be an accumulation of a manifest and content indicated in the manifest. The master buffer may be a time shift buffer that circularly buffers content of the stream, and records the latest content of the stream up to a size limit (e.g., 2 gigabytes) or to a time limit (e.g., 30 minutes of video content). The size limit and the time limit of the master buffer may be any value. After content stored in the master buffer reaches the size/time limit, the master buffer may start circular buffering, e.g., removing the oldest content from the buffer and writing the newest content into the buffer.

A separate master buffer may be maintained for every content stream or service offered by the CDN 310. In some cases, the cTSB server 306 may determine whether there is at least one user device tuning to the stream, and only maintain a master buffer for streams that are currently being viewed. If the cTSB server 306 determines that at least one user device tunes to this stream, the cTSB server 306 may send a request to the recorder 308 and instruct the recorder 308 to generate and store the master buffer for this stream. If the cTSB server 306 determines that no user device ever tunes to this stream, the cTSB server 306 may determine that a master buffer does not need to be generated. In some other cases, the recorder 308 may generate the master buffer for this stream at the system initialization regardless whether any user device tunes to this stream.

In some cases, if the cTSB server 306 determines that the stream is no longer consumed by any user device, the cTSB server 306 may instruct the recorder 308 to stop adding new content to the master copy and to maintain the master buffer. In some other cases, if the cTSB server 306 determines that this stream is no longer consumed by any user device, the cTSB server 306 may instruct the recorder 308 to delete the master buffer for this stream.

The recorder 308 may continue the circular buffering for a stream, as long as the cTSB server 306 determines that there is at least one user device consuming the stream.

The recorder 308 may generate a particular master buffer for each stream. For example, channel NBC may have its own master copy circularly buffering content of channel NBC; and channel ESPN may have its own master copy circularly buffering content of channel ESPN.

Master buffers for different streams may be stored in a same server. Alternatively, the master buffers for different streams may be stored in different servers, respectively.

In some cases, one stream may have multiple copies of its master buffer. For example, in an event such as Super Bowl, which is predicted to attract a great number of viewers, the cTBS server 306 may instruct the recorder 308 to create multiple copies of the master buffer for the channel presenting Super Bowl, and the cTSB system may distribute these multiple copies among different caching servers each serving a different geometrical region. As such, the viewers across the country may retrieve the Super Bowl content from their respective caching server. These multiple copies of the master buffer may contain same content compared to each other.

In some cases, the recorder 308 may maintain multiple different master buffers for one stream to satisfy different service levels. For example, the recorder 308 may maintain two different master buffers for channel NBC, e.g., one with a higher time limit (e.g., 60 minutes of video content), and the other one with a lower time limit (e.g., 30 minutes of video content). If a user device is associated with a higher service level, the user device may use a bigger individual pause time shift buffer (which will be discussed later) derived from the master buffer with the higher time limit of content, and vice versa.

The recorder 308 may create one or more duplicates for the master buffer and save these duplicates in memories disposed separately from the memory storing the master buffer. As such, if the memory storing the master buffer fails, cTSB system may use the duplicates as backups.

At step 324, after a user device 304 is powered on, the user device 304 may tune to a default stream or a last tuned stream. For example, if a set-top box is powered on for the first time, the set-top box may automatically tune to a default channel that was set by a cable service provider. If the set-up box is powered on after the set-top box has tuned to one or more channels, the set-top box may tune to the last tuned channel.

At step 326, the user may watch the tuned stream for some time period without interacting with the remote control 302. During this time period, the user device may receive the stream's content transmitted from a caching server in the CDN 310.

After the user device consumes the stream for some time, at step 328, the user device 304 may receive a pausing request from the remote control 302 to pause the playback of the content of the stream. For example, when the user is interrupted by a phone call during watching channel NBC, the user may press the "pause" button on the remote control 302, and the remote control 302 may send an infrared signal comprising a "pause" command. As another example, the user may touch a "pause" icon on a tablet computer, and the tablet computer may receive a "pause" command. Still as another example, the remote control 302 may comprise one or more of microphones that collect human voice, the remote control 302 may recognize the human voice and determine that the human voice is associated with a particular command (e.g., a "pause" command), and the remote control 302 may generate a data signal (e.g., a wireless data signal) associated with the particular command and send the data signal to the user device 304. Alternatively or in addition, the remote control 302 may generate audio data associated with the human voice and send the audio data to the user device, and the user device 304 may analyze the audio data (e.g., by comparing the audio data to a plurality of pre-defined audio data each associated with a particular command) and determine that the received audio data is associated with a particular command.

In some cases, the user device 304 may include one or more microphones, and the user device 304 may collect human voice and use the voice recognition technology to determine that the collected human voice is associated with a particular command.

After receiving the pausing request, at step 330, the user device 304 may stop playback of content and send a buffering request (e.g., a StartTSB request) to the cTSB server 306 to initiate buffering content in a remote time shift buffer (which will be described below) for future playback. The buffering request may include, but is not limited to, user's account information, stream information, a tune time, and a pause time. These are discussed in further detail below.

The user's account information may include a user's account credentials (e.g., account number, account name or identifier, password, etc.). Based on the user's account credentials, the cTSB server 306 may determine whether the user device is eligible to use the remote pause buffer service. If the cTSB server 306 determines the user device is eligible to use the remote pause buffer service, the cTSB server 306 may proceed to step 332 to start buffering the content. If the cTSB server 306 determines that the user device is not eligible to use the remote pause buffer service (e.g., the user device has not purchased the remote pause buffer service), the cTSB server 306 may send the user device a message to ask the user whether to purchase such a service. The user's account information may also include a service level that the user is associated with (e.g., that the user has purchased). The service level may include data indicating a size/time limit of the remote TSB for this user. For example, if the user has purchased a higher level service, the user may be eligible to use a bigger remote TSB (e.g., a remote TSB with 60 minutes of video content); and if the user has purchased a lower level service, the user may be eligible to use a smaller remote TSB (e.g., a remote TSB with 30 minutes of video content). After the cTSB server 306 receives the user device's request for resuming playback of content (which will be described below), the cTSB server 306 may store the user's account information for user's account validations. In some cases, the user's account information may comprise a unique identifier that is generated to identify the user, and exclude any personal information (e.g., the user's name, the user's age, the user's home address, etc.) associated with the user and/or any information associated with content that the user watches or selects to watch.

The stream information may include the identification of the stream that has been paused by the user device. For example, if the user device is tuning to channel NBC, the stream information may include data (e.g., channel number) indicating the NBC service.

The tune time may include data indicating a time point when the user most recently began watching the paused service. The pause time may indicate the time point when the user entered the pause command 328. For example, a user device tunes to channel NBC at time T0 and then presses the "pause" button at time T1, and there is no channel change event occurring between T0 and T1. In this example, the tune time may be T0, and the pause time may be T1.

As discussed above, after the cTSB server 306 determines that the user device is eligible to use the remote pause buffer service, and the cTSB server 306 then proceeds to step 332. At step 332, the cTSB server 306 sends a recording request (e.g., a SetupRecording request) to the recorder 308 and instructs recorder 308 to generate an individual time shift buffer (e.g., an "individual buffer") for this particular user device. The individual buffer may comprise several components. The individual buffer (and the master buffer) may comprise a storage location in which audio and/or video segment files are stored for the corresponding content. There may be multiple such segment files (e.g., a recorder may encode a television show into separate files, each containing 2 seconds of audio/video for the show), and each of those files may be listed in a manifest. The manifest may list all of the various segment files, and may also contain other information describing the content. The size limit and the time limit of the individual buffer may be any values. The recording request may include the stream information, the tune time, and the pause time.

At step 334, the recorder 308 may receive the recording request from the cTSB server 306, and start to generate an individual buffer for this user device based on the recording request. The recorder 308 may generate the individual buffer by replicating the master copy of the stream that the user is watching, and the individual buffer continues to circularly buffer the latest content based on the tune time and the pause time. For example, the user device, which is eligible to use a 30 minute remote pause buffer, tunes to channel NBC at 18:00:00, and pauses at 18:40:00. So for this particular user, the individual buffer should contain content from 18:10:00 to 18:40:00 (the previous 30 minutes before the pause time). At 18:40:00, the 30 minute master buffer for channel NBC has recorded 30 minutes of the latest NBC content. The recorder 308 generates an individual buffer for the user device by copying the last 30 minutes of content (e.g., the manifest and various segment files discussed above) from the master buffer into a new file location. As the individual buffer already has 30 minutes content at the pause time, if the user wants to perform a rewind operation (which will be further discussed later) right after pause, the user may rewind within the 30 minutes window. After generating the individual buffer, the recorder may then continue to update the individual buffer with the latest content from the stream, thereby maintaining a recording of the last 30 minutes of the program for the user. This continued updating may entail adding new 2-second audio/video segment files, and updating the manifest to indicate the network address location for the new segment files (and to delete the network address for the oldest segment file).

In some cases where the time interval between the tune time and pause time is smaller than the buffer limit, when generating the individual buffer, the recorder 308 may clear content stored prior to the tune time (or may not include content stored prior to the tune time) so that future playback may not start prior to the tune time. For example, the user device, which is eligible to use a 30 minute remote pause buffer, tunes to channel NBC at 18:00:00, and pauses at 18:10:00. In this example, the user's individual buffer might only be populated with the last 10 minutes of the channel (e.g., 18:00:00 to 18:10:00), even if the master buffer had more than that available (e.g., the master buffer might have a 30-minute duration, 60-minute duration, etc.) The recorder may then continue to circularly buffer new content from the channel into the individual buffer, as well as into the master buffer. In these cases, if the user wants to rewind right after pause, the user may rewind within the 10 minutes window (from tune to pause). Alternatively, some users may be provided with the option of populating the individual buffer with content preceding the tune time, and may even have the full history of the master buffer available.

The recorder 308 may generate an individual buffer for an individual user device. For example, an eligible user device A1 may have its own individual buffer B1, and another eligible user device A2 may have its own individual buffer B2.

In some cases, multiple user devices may pause at a same time. For example, 10 user devices (use device #1, user device #2, . . . , user device #10) may pause at a same time. In this example, the recorder 308 may generate an individual copy for user device #1 from the master buffer, and then generate the other 9 individual buffers by duplicating the individual copy for user device #1. As such, the system may only need one (1) processor to generate 10 buffers in a row, rather than needing ten (10) processors each generating an individual buffer for each user device in parallel.

After the individual buffer is generated, at step 336, the recorder 308 may send an address of the individual buffer to the cTSB server 306. The address may identify an access location at which the individual buffer, or the manifest for the individual buffer, is located.

At step 338, the cTSB server 306 may forward the address of the individual buffer to the user device 304.

As mentioned previously, the user may want to perform a rewind operation on the content so that he may watch some great scenes again. When rewinding, the user may want to preview thumbnail images (e.g., still images each generated based on an I-frame), so that the user may estimate the approximate time point that he wants to go back to. To realize this, when the user device pauses playback of content and there is no channel change, the user device 304 may download I-frames from the CDN 310 and store these I-frames in the local memory of the user device 304. The thumbnail images may also be used when the user performs other trick play operations, such as fast forward.

I-frame loop 340 illustrates an example of downloading I-frames. While the user device 304 pauses consuming content and there is no stream change (e.g., channel change), the user device 304 may keep downloading I-frames from the CDN 310 and store these I-frames in its local memory. The user device may do this by periodically obtaining a current/latest version of the stream's manifest, identifying new I-frame(s), and requesting them.

At step 341, the user device 304 may send a manifest request (e.g., a GetManifest request) to the CDN 310.

At step 342, the CDN 310 may receive the manifest request and send a manifest to the user device 304.

At step 343, the user device 304 may determine whether the newly received manifest received from the CDN 310 has been updated compared to the last manifest (e.g., determine whether there are any new I-frames indicated by the newly received manifest compared to the last manifest). If the user device 304 determines that the newly received manifest has been updated compared to the last manifest, the user device 304 may proceed to step 344. If the user device 304 determines that the newly received manifest has not been updated compared to the last manifest, the user device 304 may send another manifest request to the CDN 310. If the user device 304 has not previously received any manifest, the user device 304 may proceed to step 344 anyway.

At step 344, the user device 304 may send an I-frame request (e.g., GetIframe request) to request downloading new I-frames indicated in the newly received manifest.

At step 345, the CDN 310 may send the new I-frames for the user device 304 to download.

At step 346, the cTSB server 306 may determine whether the cTSB server 306 has not received any playback request for the content stored in the individual buffer for a certain period of time since the pause time. The certain period of time may be equal to the time limit of the user device's individual buffer. For example, if the user device 304 is eligible to use a 30 minutes individual buffer, the cTSB server 306 may determine whether the cTSB server 306 has not received any playback request for the content stored in the user device's individual buffer for 30 minutes since the pause time. If the cTSB server 306 determines that the cTSB server 306 has not received any playback request for 30 minutes since the pause time, at step 347, the cTSB server 306 may send the user device 304 a force playback request which will force the user device to exit the I-frame loop 340 and will force the user device to jump into a ReadBuffer Loop 350 of FIG. 3B (which will be described later). Forcing playback when the buffer is full may make it easier for the user to understand the buffer range when the user resumes watching.

In some cases, the cTSB server 306 may not need to send the user device 304 a force playback request. Instead, the user device may automatically resume playback of the content if a timer for a time period equal to the time limit of the user device's individual buffer expires. After the user device pauses playback of content, the user device may set a timer for a time period equal to the time limit of the user device's individual buffer. Alternatively, the user device may track time after the user device pauses playback of content.

The user device may determine whether the user device has not received a resume request (e.g., the user pressing the "play" button on the remote control 302, or the user using a voice command to resume playback of content) for a time period equal to the time limit of the user device's individual buffer since the user device paused playback of content. After the user device determines that the user device has not received a resume request for the time period equal to the time limit of the user device's individual buffer since the user device paused playback of content, the user device may automatically resume playback of the content.

As discussed above, the user may resume playback of content. For example, at step 348, the user may press the "play" button on the remote control 302 or may use a voice command to resume playback of content.

After the user device 304 receives the "play" request from the remote control 302, the user device 304 may exit the I-frame loop 340 and jump into the ReadBuffer Loop 350 of FIG. 3B (which will be described later).

As long as the user device 304 tunes to the stream and does not receive a channel change request, the user device 304 may keep downloading the I-frames.

After the user device 304 receives a channel change request, the user device 304 may delete the I-frames from the local memory.

As discussed above, when the user device receives a playback request for the stored content (e.g., either the "play" request from the remote control 302 or the force playback request from the cTSB server 306), the user device may retrieve content from the individual buffer for playback. FIG. 3B shows the ReadBuffer loop 350 that illustrates an example of how the user device retrieves content from the individual buffer. In the FIG. 3B signaling, the user device may retrieve a current manifest, use the manifest to request segment fragments for playback, and then retrieve an updated manifest as needed.

At step 351, the user device may send a manifest request (e.g., a GetManifest request) to the cTSB server 306. The manifest request may include the user's account information and the address of the individual buffer.

At step 352, the cTSB server 306 may determine whether the user's account information included in the manifest request matches the user's account information included in the buffering request (e.g., the StartTSB request described in step 330). If the cTSB server 306 determines that the user's account information included in the manifest request matches the user's account information included in the buffering request, the cTSB server 306 may validate the user's account and proceed to step 353. If the cTSB server 306 determines that the user's account information included in the manifest request does not match the user's account information included in the buffering request, the cTSB server 306 may resend a re-validation request (not shown) to request the user device 304 resending the user's account information for validation.

At step 353, after the cTSB server 306 validates the user's account, the cTSB server 306 may forward the manifest request to the recorder 308. The forwarded manifest request may include the address of the individual buffer.

At step 354, the recorder 308 may locate the individual buffer based on the address of the individual buffer included in the forwarded manifest request, and send the manifest to the cTSB server 306.

At step 355, the cTSB server 306 may forward the manifest to the user device 304.

As will be discussed in ReadFragment loop 360, the user device may use the manifest to request and playback whatever segment fragment is needed as shown in ReadFragment loop 360.

The user device may pause during playback, fast-forward, and perform other trick play operations, and the cTSB system may stay in the ReadFragment loop 360 as long as the current manifest is sufficient. The ReadFragment loop 360 shows an example of getting fragments indicated in the manifest. Within the ReadFragment loop 360, the user device may retrieve all fragments indicated in the manifest. At step 361, the user device may send a fragment request (e.g., a getFragment request) to the recorder 308 to request a fragment indicated in the manifest. At step 363, the recorder 308 may locate the fragment based on the access location of the fragment indicated in the manifest and send the fragment to the user device 304.

In some examples, a packager (not shown) may be additionally disposed anywhere between the user device 304 and the CDN 310. The packager may be a stand-alone network component; or alternatively, the packager may be an integral part of the cTSB server 306 or the recorder 308. The packager may comprise a Just-In-Time-Packaging (JITP) server. A particular user device may require a particular user device specific playback format to playback the content data. The user device may at earlier steps (e.g., at steps 330 and 332) send data associated with its user device specific playback format to the recorder 308. If the recorder 308 determines, based on user device specific playback format provided by the user device, that the format of fragment retrieved, at step 361, from the individual buffer does not match the user device specific playback format, the process may proceed to step 362. At step 362, the recorder 308 may send the retrieved fragment to the packager and request the packager convert the format of the retrieved fragment to the user device specific playback format. For example, the recorder 308 may request packager convert the MPEG encoded fragment retrieved from the individual buffer from Common Intermediate Format (CIF) to HTTP Live Streaming (HLS) for the user device to playback. After the format conversion, the packager may send the converted fragment to the user device 304; and/or, the packager may send the converted fragment back to the recorder 308 and the recorder 308 may send the converted fragment to the user device 304 as shown in step 363.

The system may exit the ReadBuffer loop 350 in cases where the user device stops sending manifest requests and/or the cTSB server 306 stops receiving manifest requests. Such cases may include, but are not limited to, the user requesting playback of live content (which will be discussed later), the user device being powered off, the player application being terminated, the user device being disconnected from the network, and the user changing to another stream.

In the case of the rewind operation, if the content is available in the individual buffer, the system may perform the ReadBuffer loop 350 to allow the user device 304 to retrieve the content starting from the rewind start time set by the user device 304. In this case, the user device 304 may send data indicating the rewind start time to the recorder 308, and the recorder 308 may generate a modified manifest which starts from the rewind start time. The user device 304 may use the modified manifest to retrieve content.

In the case where the user requests switching to live content, the user device may no longer retrieve content from the individual buffer, and may obtain the content from the CDN 310 as before. Live content may be a TV program scheduled by the program provider (e.g., the real-time NBC channel content), and may be the currently-transmitted portion of that content (e.g., whatever is currently being aired on NBC).

In some cases where the system owner had secured the legal right to reproduce the content without use of individualized buffers (e.g., individual buffers discussed above), the system does not need to generate individualized buffers. Rather, the system may allow the user devices to rewind/view the content from the master buffer(s).

Steps in FIG. 3C describe examples of how the cTSB server 306 manages the individual buffer.

When the user device changes to another stream, the cTSB server 306 may instruct the recorder 308 to delete the previous individual buffer for the user device (if any). The deleting previous individual buffer may comprise re-initializing the individual buffer (e.g., overwriting content in the individual buffer with blank content, such as zeros) and releasing the resource of the re-initialized buffer for future uses or using the resources as a new individual buffer for the newly-tuned stream, e.g., creating a new individual buffer for the user device by copying other content from the newly-tuned stream into the re-initialized buffer.

At step 380, the user may change to another stream. For example, the user may change from channel NBC to channel ABC by selecting a channel number on the remote control 302. At step 381, the remote control 302 may send a tune channel request to the user device 304.

At step 382, the user device 304 may send a deleting request (e.g., a CancelTSB request) to the cTSB server 306 for deleting the individual buffer. The deleting request may include user's account information and the address of the individual buffer.

At step 383, the cTSB server 306 may determine whether the user's account information included in the deleting request matches the user's account information included in the buffering request (e.g., the StartTSB request described in step 330). If the cTSB server 306 determines that the user's account information included in the deleting request matches the user's account information included in the buffering request, the cTSB server 306 may validate the user's account and proceed to step 384. If the cTSB server 306 determines that the user's account information included in the deleting request does not match the user's account information included in the buffering request, the cTSB server 306 may send a re-validation request (not shown) to request the user device 304 resending the user's account information for validation.

At step 384, the cTSB server 306 may send a deleting instruction to instruct the recorder 308 to delete the individual buffer. The deleting instruction may include the address of the individual buffer.

At step 385, after the recorder 308 receives the deleting instruction, the recorder 308 may locate the individual buffer based on the address of the individual buffer and delete the individual buffer. Deleting the individual buffer may comprise releasing resources associated with the individual buffer. For example, after the recorder 308 receives the deleting instruction, the recorder 308 may release the memory that stores the individual buffer.

After deleting the individual buffer, at step 386, the recorder 308 may send the cTSB server 306 a delete confirmation message (e.g., a Success message) and inform the cTSB server 306 that the individual buffer has been deleted. At step 387, the recorder 308 may forward the delete confirmation message to the user device 304.

In some examples, after the user device changes to another stream as discussed above, step 382 may be combined with step 330, step 384 may be combined with 332, and step 385 may be combined with step 334, step 386 may be combined with step 336, and step 387 may be combined with step 338. For example, at step 382, in addition to sending a deleting request to the recorder 308, the user device 304 may send a buffering request (e.g., a StartTSB request as shown in step 330) to cTSB server 306 to start a new individual buffer associated with the new channel. As another example, at step 384, in addition to sending a deleting instruction to the recorder 308, the cTSB server 306 may send a recording request (e.g., a SetupRecording request as shown in step 332) to the recorder 308 to generate another individual buffer associated with the new channel. The generating another individual buffer may comprise updating the individual buffer by copying the content of the new channel into the individual buffer.

If the cTSB server 306 determines that an individual copy has not been used for a certain amount of time (e.g., 2 hours) since the pause time, the cTSB server 306 may delete the individual copy. The certain amount of time may be any amount of time. For example, the user device may lose network connection with the cTSB system, and is unable to restore the network connection for a day. In this example, the cTSB server 306 may determine to delete the individual copy.

At step 392, the cTSB server 306 may determine whether cTSB has not received any manifest requests for a certain amount of time (e.g., 2 hours) since the pause time. If the cTSB server 306 determines that the cTSB server 306 has not received any manifest requests for the certain amount of time since the pause time, the recorder 308 may delete the individual buffer (steps 394, 396, and 398). Steps 394, 396, and 398 are similar to steps 384, 385, and 386, respectively.

In order to determine whether the cTSB server 306 has not received any manifest requests for a certain amount of time since the pause time, the cTSB server 306 may record the last time when cTSB server 306 received a manifest request and the last fragment that was retrieved by the user device.

Since the cTSB server 306 records the last time of receiving a manifest request and the last retrieved fragment, the cTSB system may allow one or more of other user devices, which share the same user's account as the user device, to resume playback from the fragment following the last requested fragment.

In some cases, the cTSB server 306 may send a warning to the user device before the individual buffer will be deleted. For example, if the cTSB server 306 determines that cTSB has not received any manifest requests for 1 hour and 55 minutes since the pause time, the cTSB sever 306 may send the warning to the user device and inform the user device that the individual buffer will be deleted in 5 minutes. If the cTSB server 306 still does not receive any manifest requests in 5 minutes, the cTSB server 306 may delete the individual buffer.

The cTSB server 306 may also delete the individual buffer after the user device is powered off, or when the player application is terminated. Upon the user device is powered off or when the player application is terminated, the user device may send a deleting request to request the cTSB server 306 to delete the individual buffer. The cTSB server 306 may then send a delete instruction to instruct the recorder 308 to delete the individual buffer.

In some cases, the user device may maintain a local TSB to increase the buffering capacity. The local TSB and the individual buffer together may provide an increased buffering capacity (e.g., the size/time limit of the local TSB plus the size/time limit of the individual buffer) for future playbacks (e.g., a playback resume operation, a rewind operation, or other trick play operations).

In these cases, after tuning to a channel, the user device may store the last viewed content in the local TSB up to the size/time limit of the local TSB, and maintain and update a local manifest indicating the content stored in the local TSB. The user device may receive a pause command. After pause, the user device may stop recording content in the local TSB and maintain the already recorded content in the local TSB, and the cTSB server 306 may start recording the latest content from the CDN 310 in the individual buffer up to the size/time limit of the individual buffer.

In some examples, the user may resume playback of content before the size/time limit of the individual buffer is reached (e.g., a timer for a time period equal to the time limit of the individual buffer expires). The user device may receive the manifest associated with the individual buffer. Based on the local manifest and the manifest associated with the individual buffer, the user device may determine to retrieve content from one of the local TSB and the individual buffer, depending on availability of the content. For example, the individual buffer may store content associated with a time period after the pause time. When the user resumes playback of content without a rewind operation, and the user device may retrieve the content associated with a time period after the pause time from the individual buffer. If the user requests a rewinding operation, based on the local manifest and the manifest associated with the individual buffer, the user device may retrieve content either from the local TSB or from the individual buffer, depending on where the user wants to go back to. For example, the user may want to go back to a previously viewed scene and the local TSB stores content of the previously viewed scene. The user device may retrieve such content from the local TSB.

In some examples, the user does not resume playback of content even when the size/time limit of the individual buffer has been reached. After the size/time limit of the individual buffer is reached, the cTSB server 306 may send data to inform the user device that the size/time limit of the individual buffer has been reached. If the user device determines that the last viewed content stored in the local TSB does not reach the size/time limit of the local TSB, the user device may restart to record the latest content from the CDN 310 in the local TSB until the size/time limit of the local TSB is reached. While restarting to record, the user device may send data to inform the cTSB server 306 that the user device restarts to record, and the cTSB server 306 may stop recording content in the individual buffer when the user device restarts to record. After the size/time limit of the local TSB is also reached, the user device may send data to inform the cTSB server 306 that the size/time limit of the local TSB has also been reached, and the cTSB server 306 may send a forced playback request to force the user device to resume playback of content. The user device may receive a manifest of the individual buffer. During the forced playback, based on the local manifest and the manifest associated with the individual buffer, the user device may determine to retrieve content from one of the local TSB and the individual buffer, depending on availability of the content. During the forced playback, the user device and the cTSB server 306 may continue to use the local TSB and/or the individual buffer to record the latest content from the CDN 310 (e.g., by overwriting the oldest content in the local TSB and the individual buffer with the latest content) for future playbacks. When one of the local TSB and the individual buffer records, the other one may stop recording and maintain the already recorded content. If the user requests a rewinding operation, based on the local manifest and the manifest associated with the individual buffer, the user device may retrieve content either from the local TSB or from the individual buffer, depending on where the user wants to go back to.

In some examples, the user device may send information associated with content stored in the local TSB to the cTSB server 306, and the cTSB server 306 may maintain and update a combined manifest indicating both of the content stored in the local cTSB and content stored in the individual buffer. If the user device receives a resume request and/or a rewind request, the cTSB server 306 may send the combined manifest to the user device. The user device may use the combined manifest to retrieve the requested content from one or more of the local TSB and the individual buffer.

In an example where content is available in both of the local TSB and the individual buffer, the user device may retrieve the content from the local TSB so that the user device does not need to occupy network bandwidth to retrieve the content from the individual buffer.

In an example where the user device maintains a local TSB with a sizes/time limit (e.g., 30 minutes of video content) and the user device is eligible to use a 30 minute remote pause buffer, the system may provide an increased buffering capacity (e.g., 60 minutes of video content) for future playbacks. At time T0, the user device may tune to a service stream. While the user device downloads content of the service stream for playback, the user device may store the last viewed content in the local TSB up to 30 minutes. At time T1, the user device may receive a pause request and pause playback of content. At time T1, the user device may stop recording content in the local TSB and the cTSB server 306 may start recording the latest content from CND 310 in the individual buffer. So, at time T1, the local TSB stores up to 30 minutes of the latest viewed content, and the cTSB server 306 starts recording the latest content (e.g., content after T1, starting from the fragment immediately following the last fragment stored in the local TSB) from the CDN 310 in the individual buffer up to 30 minutes of content. The user device may send information associated with the content stored in the local TSB to the cTSB server 306, and the cTSB server 306 may maintain a combined manifest indicating both of the content stored in the local TSB and the content stored in the individual buffer. If the user device receives a resume request without a rewind operation, the user device may receive the combined manifest from the cTSB sever 306, and retrieve, based on the combined manifest, content (e.g., the content after T1, starting from the fragment immediately following the last fragment stored in the local TSB) from the individual content. If a rewind operation is requested, the cTSB server 306 may send the combined manifest to the user device, and the user device may retrieve, based on the combined manifest, content up to 30 minutes prior to T1 from the local TSB.

The order of the signal diagram of FIGS. 3A-3C may vary. For example, rather than generating and maintaining a master buffer at the system initialization, the recorder 308 does not need to generate the master buffer until the cTSB server 306 determines that at least one user device pauses playback of the channel content. In this example, the recorder 308 may generate the individual buffer for the first user device by replicating the master buffer, and the individual buffer for the first user device may be identical to the master buffer.

One or more steps in FIGS. 3A-3C may be omitted. For example, step 322 may be omitted. In this example, the recorder 308 does not need to generate or maintain a master buffer at all. In this example, when the user device pauses, the recorder 308 may generate an individual buffer by circularly recording the latest content from the CDN 310.

Figure 4:
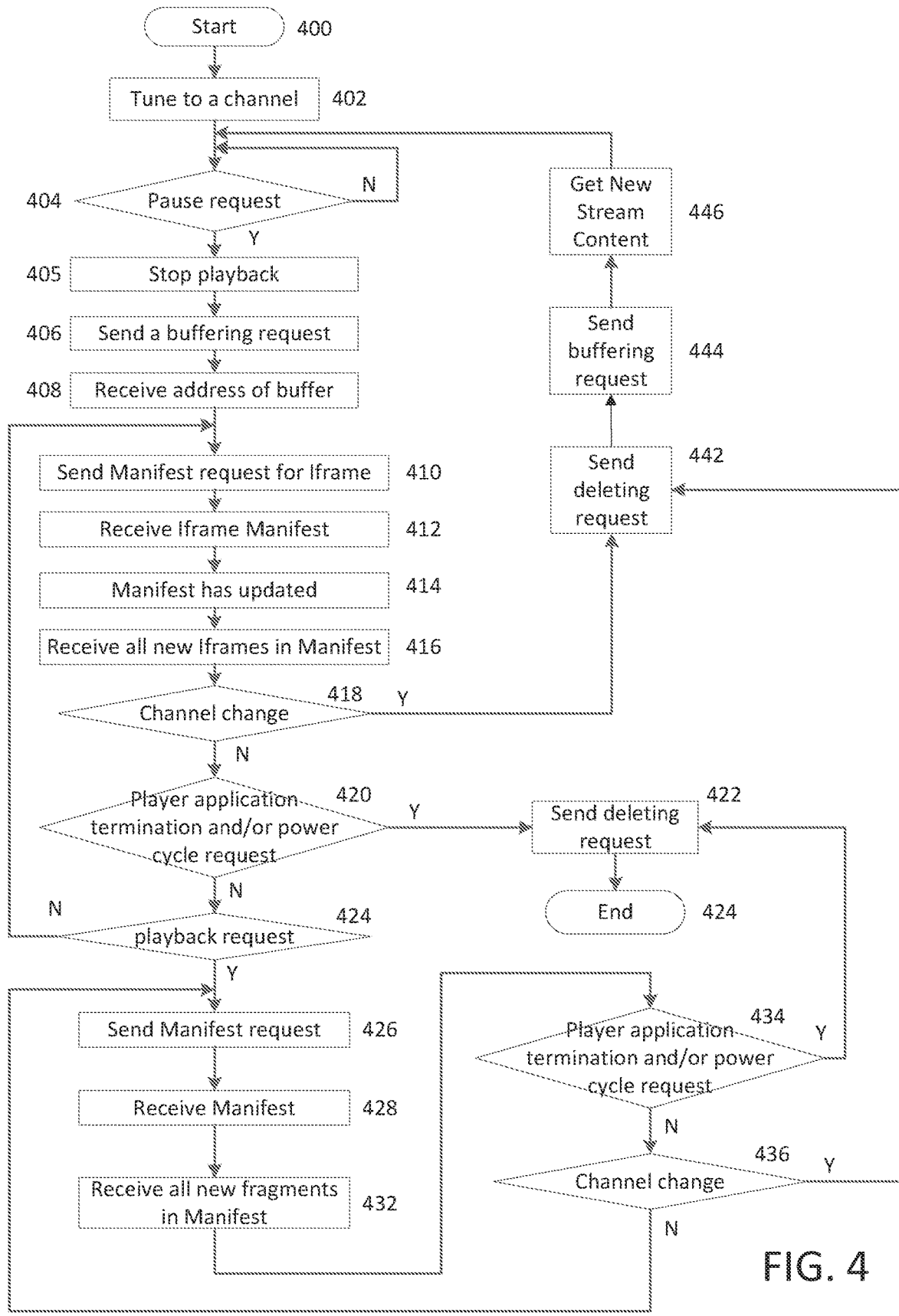
FIG. 4 is a flow chart showing an example method for operation of a user device.

FIG. 4 is a flow chart showing an example method for operation of a user device (e.g., the user device 304 as shown in FIGS. 3A-3C).

The operation of the user device may start from step 400 at which the user device is initialized. For example, the user device may be powered on.

After the user device is powered on, at step 402, the user device may tune to a default stream or a last tuned stream. This step may be similar to step 324 as shown in FIG. 3A.

At step 404, the user device may determine if the user device receives a pausing request from the user to pause playback of content of the stream. As discussed above, the pausing request may comprise an infrared signal from a remote control, a voice command to pause, or a "pause" command entered by a user via a user interface displayed on a screen of a tablet computer. If the user device receives a pausing request, the process may proceed to step 405; otherwise, the process may return to step 404 and await a pausing request.

After receiving the pausing request, at step 405, the user device may stop the playback of the content of the stream. At step 406, the user device may send a buffering request (e.g., the StartTSB request as shown in FIG. 3A) to a cTSB server (e.g., the cTSB server 306 as shown in FIGS. 3A-3C) to initiate buffering content in a remote time shift buffer (e.g., an individual buffer) for future playback. As discussed above, the buffering request may include, but is not limited to, user's account information, stream information, a tune time, and a pause time. Steps 405 and 406 may be similar to step 330 as shown in FIG. 3A.

As discussed above, after receiving the buffering request, the cTSB server may instruct a recorder (e.g., the recorder 308 as shown in FIGS. 3A-3C) to generate and store an individual buffer associated with the current service being paused for the user device. At step 408, the user device may receive an address of the individual buffer indicating at which the individual buffer, or a manifest for the individual buffer, is located. Step 408 may be similar to step 338 as shown in FIG. 3A.

As discussed above, when rewinding, the user may want to preview thumbnail images. To generate the thumbnail images, the user device 304 may download I-frames from a CDN (e.g., the CDN 310 as shown in FIGS. 3A-3C) and store these I-frames in the local memory of the user device 304. Steps 410, 412, 414, 416, 418, 420, and 424 are example steps that may be performed by the user device during the downloading of I-frames.

At step 410, the user device may send a manifest request (e.g., a GetManifest request) to the CDN. Step 410 may be similar to step 341.

At step 412, the user device may receive a manifest from the CDN. Step 412 may be similar to step 342.

At step 414, the user device 304 may determine that the manifest has been updated compared to the last manifest (e.g., determine whether there are new I-frames indicated by the manifest compared to the last manifest). Step 414 may be similar to step 343.

At step 416, the user device may receive all new I-frames in the manifest. Step 416 may be similar to steps 344 and 345.

At step 418, the user device may determine whether the user device receives a channel change request (e.g., a request for switching from an old stream to a new stream). If the user device receives a channel change request, the process may proceed to step 442 and then to step 444; otherwise, the process may proceed to step 420

If the user device receives a channel change request, at step 442, the user device may send a deleting request (e.g., a CancelTSB request as shown in FIG. 3C) to the cTSB server for deleting the individual buffer associated with the old stream. At step 444, the user device may also send a buffering request (e.g., a StartTSB request as shown in FIG. 3A) to the cTSB server to start another individual buffer associated with the new stream. At step 446, if the user device does not receive a pause request after changing to the new stream, the user device may no longer retrieve content from the individual buffer, and may obtain the content from the CDN 310. The user device may then await another pause request.

If the user device does not receive a channel change request, at step 420, the user device may determine whether the user device receives a power cycle request or an application terminating request. The power cycle request may request a power cycle of the computing device, and the application terminating request may request terminating a player application executing the playback of the content of the another service. If the user receives one or more of these requests, the user device may perform one or more of these operations and the process may proceed to step 422; otherwise, the process may proceed to step 424.

At step 422, the user device may send a deleting request (e.g., a CancelTSB request as shown in FIG. 3C) to the cTSB server for deleting the individual buffer. The process may end at step 424.

If the user device does not receive a power cycle request or an application terminating request, at step 424, the user device may determine whether the user device automatically resumes playback of the content if a timer (set by the user device) for a time period equal to the time limit of the user device's individual buffer expires, receives a playback request (e.g., a force playback request as shown in step 347, a "play" request as shown in step 348, or receives a trick operation such as a rewind operation as discussed above) for the content stored in the individual buffer. If the user device receives a playback request, the process proceeds to step 426 to start retrieving content from the individual buffer; otherwise, the process returns to step 410 and the user device continues to download new I-frames.

At step 426, the user device may send a manifest request (e.g., a GetManifest request as shown in FIG. 3B) to the cTSB server. The manifest request may include the user's account information and the address of the individual buffer. Step 426 may be similar to step 351.

As discussed above, the cTSB server may validate the user's account based on the user's account information. After validation, similar to step 355, at step 428, the user device may receive a manifest associated with the individual buffer based on the address of the individual buffer.

At step 432, the user device may retrieve all fragments indicated in the current manifest. Step 432 may be similar to the ReadFragment loop 360.

Similar to step 420, at step 434, the user device may determine whether the user device receives a power cycle request or an application terminating request. If the user receives one or more of these requests, the process may proceed to step 422 and then end at step 424; otherwise, the process may proceed to step 436.

Similar to step 418, at step 436, the user device may determine whether the user device receives a channel change request. If the user device receives a channel change request, the process may proceed to step 442 (requesting deletion of the individual buffer associated with the old stream) and then step 444 (starting an individual buffer associated with the new stream); otherwise, the process may return to step 426 to get an updated or additional manifest if available.

The order of the signal diagram of FIG. 4 may vary. For example, step 406 may be performed before step 405. As another example, steps 418, 420, and 424 may be performed in any order. Still as another example, step 436 may be performed before step 434. Yet as another example, steps 442, 444, and 446 may be performed in any order.

Figure 5:
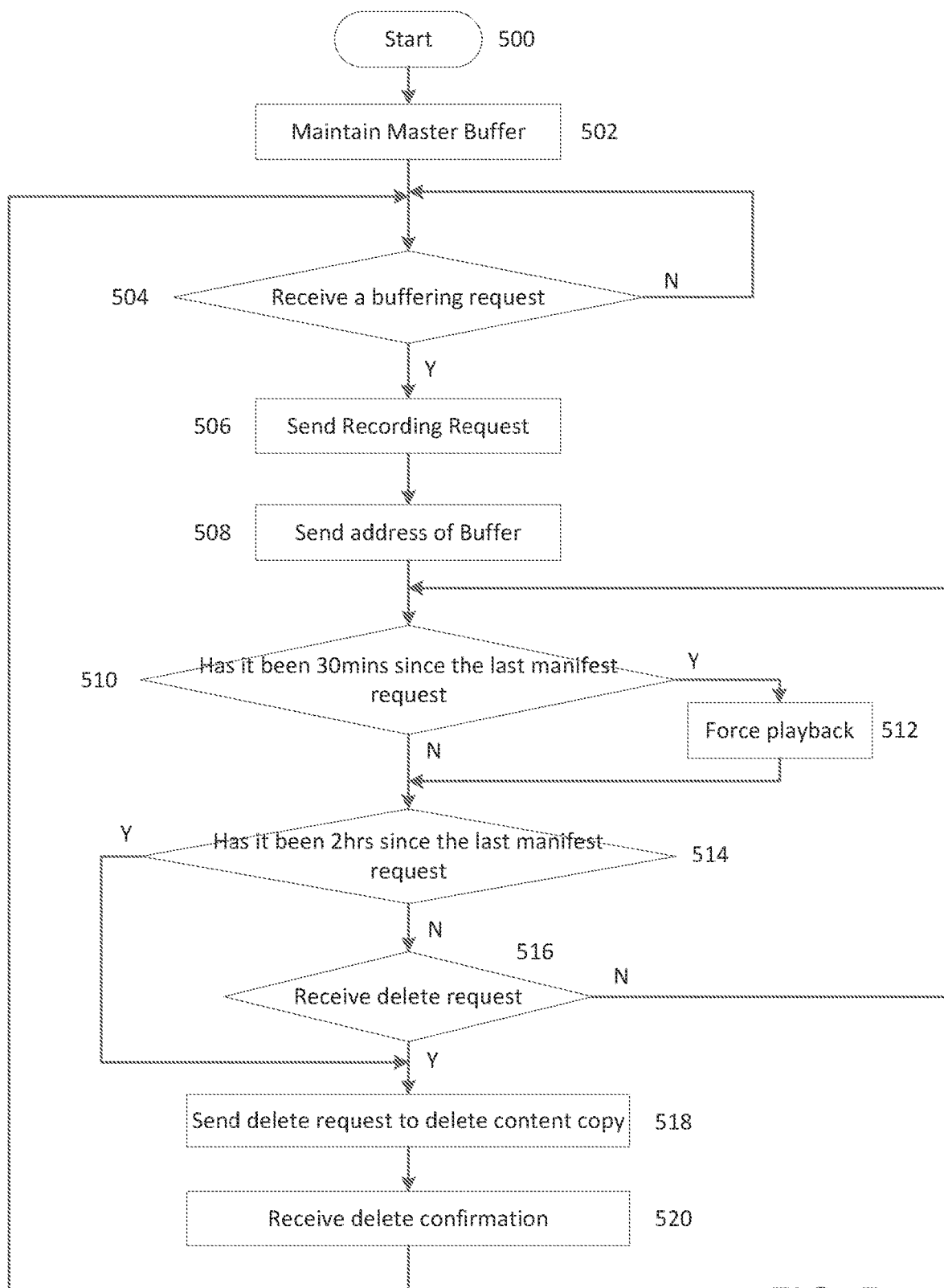
FIG. 5 is a flow chart showing an example method for operation of a cTSB server.

FIG. 5 is a flow chart showing an example method for operation of a cTSB server (e.g., the cTSB server 306 as shown in FIGS. 3A-3C).

The operation of the cTSB server may start from step 500 at which the cTSB server is initialized. For example, the cTSB server may be powered on.

At step 502, the cTSB server may generate and maintain a particular master buffer (which has been discussed above) for a particular stream. Step 502 is similar to step 322.

As discussed above, after a user device (e.g., the user device 304 as shown in FIGS. 3A-3C) pauses playback of content of a stream, the user device may send a buffering request (e.g., a StartTSB request as shown on FIG. 3A) to the cTSB server to start an individual buffer associated with the stream being paused for the user device. Similar to steps 330 and 332, at step 504, the cTSB server may determine whether the cTSB server receives such a buffering request. If the cTSB server receives a buffering request, the cTSB server may proceed to step 506; otherwise, the cTSB server may return to step 504 and continue to monitor whether the cTSB server receives a buffering request.

As discussed above, the cTSB server may validate the user's account based on the user's account information included in the buffering request. After validation, at step 506, the cTSB server may send a recording request (e.g., a SetupRecording request as shown in FIG. 3A) to a recorder (e.g., the recorder 308 as shown in FIGS. 3A-3C) and instruct the recorder to generate an individual buffer associated with the stream that being paused by the user device. Step 506 may be similar to step 332.

As discussed above, while the recorder is generating the individual buffer, the recorder may send an address of the individual buffer to the cTSB server to indicate where the individual buffer is located. At step 508, the cTSB server may send the address of the individual buffer to the user device for future retrieval. Step 508 may be similar to step 338.

As discussed above, the user device may receive a playback request (e.g., a force playback request as shown in step 347, a "play" request as shown in step 348, or a trick operation such as a rewind operation as discussed above). After receiving a playback request, the user device may send a manifest request (e.g., a GetManifest request as shown in FIG. 3B) to the cTSB server. The cTSB server may keep monitoring a manifest request, and forward the manifest request to the recorder so that the recorder may send the corresponding manifest to the user device. The recorder may keep updating the individual buffer as well as the master buffer.

As discussed above, if the cTSB server has not received any playback request for a certain time period (e.g., a time limit of the individual buffer) since the pause time, the cTSB server may force the user device to start playback of the content stored in the individual buffer. At step 510, the cTSB server may determine whether it has been a certain period of time (e.g., 30 minutes for the individual buffer with a 30 minutes time limit) since the cTSB server received the last manifest request. If the cTSB server determines that it has been a certain period of time since the cTSB server received the last manifest request, the cTSB server may proceed to step 512 to force the user device to start playback of the content in the individual buffer; otherwise, the process may proceed to step 514. Step 510 may be similar to step 346, and step 512 may be similar to step 347.

At step 514, the cTSB server may further determine whether it has been another longer certain period of time (e.g., 2 hours) since the cTSB received the last manifest request. Another longer certain period of time may be any time period longer than the time limit of the individual buffer. Step 514 may be similar to step 392.

If it has been another longer certain period of time since the cTSB received the last manifest request, the cTSB server may proceed to step 518 and instruct the recorder to delete the individual buffer. Step 518 may be similar to step 394. After the recorder deletes the individual buffer, the recorder may send a delete confirmation (e.g., the first Success message as shown in FIG. 3C), and the cTSB server may receive a delete confirmation (e.g., the second Success message as shown in FIG. 3C) from the recorder at step 520. The cTSB server then may return to step 504 and continue to monitor a playback request.

If it has not been another longer certain period of time (e.g., 2 hours) since the cTSB received the last manifest request, the cTSB server may proceed to step 516. At step 516, the cTSB server may determine whether the cTSB server receives a deleting request (e.g., a CancelTSB request) from a user device. If the cTSB server receives a deleting request from a user device, the cTSB server may validate the user account and proceed to step 518 to delete the individual buffer indicated in the deleting request. If the cTSB server does not receive a deleting request from a user device, the cTSB server may return to step 510 and continue to monitor whether it has been a certain time period (e.g., a time limit of the individual buffer) since the pause time.

The order of the signal diagram of FIG. 5 may vary. For example, step 516 may be performed before step 514.

One or more steps in FIG. 5 may be omitted. For example, similar to step 322, step 502 may be omitted.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a time shift buffer computing device, a content item for delivery to a player device remote from the time shift buffer computing device;
   generating, by the time shift buffer computing device, a time shift buffer associated with the content item and the player device;
   recording, by the time shift buffer computing device and in the time shift buffer, the content item in a first format;
   receiving, by the time shift buffer computing device and from the player device, a request for the content item;
   sending, by the time shift buffer computing device, based on the request for the content item, and to a packaging server:
      the content item in the first format; and a request to convert the content item from the first format to a second format associated with the player device;

sending, to the player device, based on determining that a predetermined quantity of time has passed without receiving a new request for the content item, and prior to deleting the time shift buffer, an alert indicating the time shift buffer is scheduled for deletion; and deleting, by the time shift buffer computing device and based on determining that the predetermined quantity of time has passed without receiving a new request for the content item, the time shift buffer associated with the content item and the player device.

2. The method of claim 1, wherein the packaging server is remote from both the time shift buffer computing device and the player device.

3. The method of claim 1, further comprising:

receiving, by the time shift buffer computing device and from the packaging server, the content item in the second format; and sending, by the time shift buffer computing device and to the player device, the content item in the second format.

4. The method of claim 1, further comprising:

causing, by the time shift buffer computing device, the packaging server to send, to the player device, the content item in the second format.

5. The method of claim 1, wherein the generating the time shift buffer further comprises:

receiving information indicating a service level associated with the player device; and determining a size, of the time shift buffer, corresponding to the service level.

6. The method of claim 1, further comprising:

receiving, by the time shift buffer computing device, information indicating one or more of:
  the player device is outputting a different content item;
  the player device is powered off; or
  an application, installed on the player device and outputting the content item, is terminated; and releasing, based on the information, a resource of the time shift buffer.

7. The method of claim 1, further comprising:

after determining that content in the time shift buffer satisfies a threshold, sending a signal to the player device to:
  record additional content of the content item in a local buffer of the player device; or
  resume playback of the content item from the time shift buffer.

8. The method of claim 1, wherein the determining that a predetermined quantity of time has passed comprises:

recording, by the time shift buffer computing device, a time point when the time shift buffer computing device received the request for the content item; and monitoring, by the time shift buffer computing device, for requests for the content item, from the recorded time point until the predetermined quantity of time has elapsed.

9. The method of claim 1, wherein the deleting is based on determining that the predetermined quantity of time has passed without receiving a play request for the content item.

10. The method of claim 1, further comprising:

generating, by the time shift buffer computing device, a plurality of additional time shift buffers respectively corresponding to a plurality of different player devices.

11. The method of claim 1, further comprising sending, after recording the content item in the first format, an address of the time shift buffer to the player device.

12. An apparatus comprising:

one or more processors, and memory storing instructions that, when executed by the one or more processors, cause the apparatus to:
  receive a content item for delivery to a player device remote from the apparatus;
  generate a time shift buffer associated with the content item and the player device;
  record, in the time shift buffer, the content item in a first format;
  receive, from the player device, a request to deliver the content item;
  based on the request to deliver the content item and to a packaging server, send:
    the content item in the first format; and
    a request to convert the content item from the first format to a second format associated with the player device;
  send, to the player device, based on determining that a predetermined quantity of time has passed without receiving a new request for the content item, and prior to deleting the time shift buffer, an alert indicating the time shift buffer is scheduled for deletion; and
  delete, based on determining that the predetermined quantity of time has passed without receiving a new request for the content item, the time shift buffer associated with the content item and the player device.

13. The apparatus of claim 12, wherein the instructions, when executed by the one or more processors, further cause the apparatus to:

receive, from the packaging server, the content item in the second format; and send, to the player device, the content item in the second format.

14. The apparatus of claim 12, wherein the instructions, when executed by the one or more processors, further cause the apparatus to:

cause the packaging server to send, to the player device, the content item in the second format.

15. The apparatus of claim 12, wherein the instructions, when executed by the one or more processors, cause the apparatus to generate the time shift buffer further by:

receiving information indicating a service level associated with the player device; and determining a size, of the time shift buffer, corresponding to the service level.

16. The apparatus of claim 12, wherein the instructions, when executed by the one or more processors, further cause the apparatus to:

receive information indicating one or more of:
  the player device is outputting a different content item;
  the player device is powered off; or
  an application, installed on the player device and outputting the content item, is terminated; and release, based on the information, a resource of the time shift buffer.

17. The apparatus of claim 12, wherein the instructions, when executed by the one or more processors, further cause the apparatus to:

after determining that content in the time shift buffer satisfies a threshold, send a signal to the player device to:

record additional content of the content item in a local buffer of the player device; or resume playback of the content item from the time shift buffer.

18. A system comprising:

a time shift buffer computing device; and a packaging server, wherein the time shift buffer computing device comprises:

one or more first processors, and first memory storing first instructions that, when executed by the one or more first processors, cause the time shift buffer computing device to:

receive a content item for delivery to a player device remote from the time shift buffer computing device;

generate a time shift buffer associated with the content item and the player device;

record, by the time shift buffer, the content item in a first format;

receive, from the player device, a request to deliver the content item;

based on the request to deliver the content item and to a packaging server, send:

the content item in the first format; and a request to convert the content item from the first format to a second format associated with the player device;

send, to the player device, based on determining that a predetermined quantity of time has passed without receiving a new request for the content item, and prior to deleting the time shift buffer, an alert indicating the time shift buffer is scheduled for deletion; and delete, based on determining that the predetermined quantity of time has passed without receiving a new request for the content item, the time shift buffer associated with the content item and the player device, and wherein the packaging server comprises:

one or more second processors, and second memory storing second instructions that, when executed by the one or more second processors, cause the packaging server to:

receive, from the time shift buffer computing device, the content item in the first format and the request; and convert, based on the request, the content item from the first format to the second format.

19. The system of claim 18, wherein the packaging server is remote from both the time shift buffer computing device and the player device.

20. The system of claim 18, wherein the first instructions, when executed by the one or more first processors, further cause the time shift buffer computing device to:

receive, from the packaging server, the content item in the second format; and send, to the player device, the content item in the second format.

21. The system of claim 18, wherein the second instructions, when executed by the one or more second processors, further cause the packaging server to:

send, to the player device, the content item in the second format.

22. The system of claim 18, wherein the first instructions, when executed by the one or more first processors, cause the time shift buffer computing device to generate the time shift buffer by:

receiving information indicating a service level associated with the player device; and determining a size, of the time shift buffer, corresponding to the service level.

23. The system of claim 18, wherein the first instructions, when executed by the one or more first processors, further cause the time shift buffer computing device to:

receive information indicating one or more of:

the player device is outputting a different content item;

the player device is powered off; or an application, installed on the player device and outputting the content item, is terminated; and release, based on the information, a resource of the time shift buffer.

24. The system of claim 18, wherein the first instructions, when executed by the one or more first processors, further cause the time shift buffer computing device to:

after determining that content in the time shift buffer satisfies a threshold, send a signal to the player device to:

record additional content of the content item in a local buffer of the player device; or resume playback of the content item from the time shift buffer.

* * * * *

UNITED STATES PATENT AND TRADEMARK OFFICE
CERTIFICATE OF CORRECTION

| | | |
|---|---|---|
| PATENT NO. | : 11,917,216 B2 | Page 1 of 1 |
| APPLICATION NO. | : 17/495478 | |
| DATED | : February 27, 2024 | |
| INVENTOR(S) | : Garey Hassler | |

It is certified that error appears in the above-identified patent and that said Letters Patent is hereby corrected as shown below:

In the Specification

In the Detailed Description

Column 8, Line 51:
Delete "cTBS" and insert --cTSB--

Column 16, Line 49:
Delete "sever" and insert --server--

Column 18, Line 47:
Delete "sever" and insert --server--

Signed and Sealed this
Twenty-second Day of April, 2025

Coke Morgan Stewart
*Acting Director of the United States Patent and Trademark Office*